(12) United States Patent
Ebersberger et al.

(10) Patent No.: US 10,085,192 B2
(45) Date of Patent: Sep. 25, 2018

(54) RADIO DEVICE AND A METHOD FOR THE TRANSMISSION OF INFORMATION

(71) Applicant: Rohde & Schwarz GmbH & Co. KG, Munich (DE)

(72) Inventors: Michael Ebersberger, Olching (DE); Torsten Langguth, Unterhaching (DE); Rainer Storn, Kirchheim (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 84 days.

(21) Appl. No.: 14/627,932

(22) Filed: Feb. 20, 2015

(65) Prior Publication Data

US 2016/0021590 A1 Jan. 21, 2016

(30) Foreign Application Priority Data

Feb. 20, 2014 (DE) .......................... 10 2014 203 093

(51) Int. Cl.
| | | |
|---|---|---|
| *H04W 36/18* | (2009.01) | |
| *H04W 76/15* | (2018.01) | |
| *H04B 1/00* | (2006.01) | |
| *H04B 1/403* | (2015.01) | |
| *H04B 1/74* | (2006.01) | |
| *H04W 36/00* | (2009.01) | |
| *H04K 3/00* | (2006.01) | |
| *H04K 1/00* | (2006.01) | |

(52) U.S. Cl.
CPC .......... *H04W 36/18* (2013.01); *H04B 1/0003* (2013.01); *H04B 1/406* (2013.01); *H04B 1/74* (2013.01); *H04K 3/226* (2013.01); *H04W 36/0022* (2013.01); *H04W 76/15* (2018.02); *H04K 1/00* (2013.01)

(58) Field of Classification Search
CPC .......... H04B 1/003; H04B 1/406; H04B 1/74; H04W 36/0022; H04W 36/18; H04W 76/025
USPC ........................................................ 370/331
See application file for complete search history.

(56) References Cited

U.S. PATENT DOCUMENTS

| | | | |
|---|---|---|---|
| 6,418,116 B1 * | 7/2002 | Egoshi .................. | H04J 3/0602 340/2.1 |
| 6,876,864 B1 * | 4/2005 | Chapin .................. | H04B 1/406 455/509 |
| 7,430,415 B2 * | 9/2008 | Campbell ................ | H04B 1/40 340/10.1 |
| 7,551,988 B1 | 6/2009 | Wichgers et al. | |
| 7,831,255 B1 | 11/2010 | Gribble et al. | |
| 7,941,248 B1 * | 5/2011 | Tsamis ................. | G08G 5/0013 701/3 |
| 2007/0202890 A1 | 8/2007 | Feher | |
| 2015/0341057 A1 * | 11/2015 | Adamek .............. | H04B 1/0003 370/384 |

* cited by examiner

*Primary Examiner* — Stephen J Clawson
(74) *Attorney, Agent, or Firm* — Potomac Technology Law, LLC

(57) ABSTRACT

A radio device for the transmission of information has a radio-device control unit, at least one antenna, an antenna switchover unit and at least one radio unit. The radio device provides a static radio unit and at least one dynamic radio unit, wherein at least two radio units are radio-ready, so that, by means of a switchover signal of the radio-device control unit, a switchover between the radio-ready radio units can be implemented in a real-time manner.

14 Claims, 3 Drawing Sheets

RADIO DEVICE AND A METHOD FOR THE TRANSMISSION OF INFORMATION

PRIORITY

This application claims priority of German Patent Application No. 10 2014 203 093.5, filed Feb. 20, 2014.

FIELD OF INVENTION

The invention relates to a radio device and a method for the transmission of information.

BACKGROUND OF THE INVENTION

In radio transmission, different radio methods are used for the transmission of information with different communications participants. Accordingly, many parameters are critical for the selection of a radio method suitable for the respective requirement. One of these parameters is the type of information to be transmitted, because, for example, it is critical whether language information or data information is to be transmitted. Furthermore, the distance between the communications participants, the number of communications participants, the type of communications participants and/or the technical circumstances of the individual communications participants are also co-critical as parameters for the selection of a suitable radio method.

These different radio methods are ideally available within a single radio device. For example, a system and a method for the provision of different radio methods within a single device are described in U.S. Pat. No. 7,831,255 B1. In this context, a single data interface is connected to a plurality of modems and connected via a switchover switch to a multiplicity of antenna circuits. Although switching between several radio methods is a complex process which determines a plurality of modifications and configuration changes within the radio device, contemporary users expect the switchover to be implemented in an instantaneous manner. In this context, the duration for the change from one radio method to an alternative radio method in radio devices according to the prior art may substantially be determined by the complexity of the radio method to be loaded. This change is currently not realizable in a real-time manner. This gains in significance especially in an emergency situation if it is necessary to switch from a radio method which has just been used to an emergency radio method.

Important core radio methods, such as the emergency radio method, must therefore be available within the radio device at all times and, furthermore, must not be disturbed by any faulty behavior in other radio methods. A change to a core radio method must also not be prevented as a result of faulty behavior of the radio device.

Attempts are currently being made to secure the freedom from error of such core radio methods by means of complex development processes associated with certification by an authorized certification authority.

Independently of the core radio methods which secure a minimum functionality, additive radio methods are known. These additive radio methods can also be introduced into the radio device after the supply of the radio device to the user. Furthermore, already existing additive radio methods can be retrospectively varied and/or supplemented. In this context, it must be ensured that these additive radio methods do not influence the core radio method in any way and/or necessitate a re-certification of the core radio method.

What is needed, therefore, is an approach for a radio device and a method for the transmission of information, with the assistance of which it is possible to switch between different radio methods in real-time and in a disturbance-free manner.

SUMMARY OF THE INVENTION

Embodiments of the present invention advantageously address the foregoing requirements and needs, as well as others, by providing a radio device and a method for the transmission of information, with the assistance of which it is possible to switch between different radio methods in real-time and in a disturbance-free manner.

In accordance with example embodiments of the invention a radio device for the transmission of information comprises a radio-device control unit, at least one antenna, an antenna switchover unit and at least two radio units. According to such embodiments, the radio device provides a static radio unit and at least one dynamic radio unit, wherein at least two of the radio units are radio ready, so that it is possible to switch between the radio-ready radio units in a real-time manner by means of a switchover signal of the radio-device control.

According to one example embodiment, an approach is provided for at least two radio units which are radio ready at all times. By way of example, a radio-ready radio method is understood here as a radio method which has already set up a communications connection with a communications participant prior to the changeover, wherein the radio-ready radio method is either kept active by means of the radio device or is disposed in a standby mode and can be activated at any time.

The provision of at least two radio units in a radio-ready standby mode ensures that an interruption-free switchover between different radio methods is possible. The radio units differ from one another in that each of the radio units in the radio device uses a specific radio method. The radio methods differ from one another especially in complexity, expandability, type of information to be transmitted and information throughput per unit of time.

According to a further embodiment a static radio unit is certified with a certificate of an authorized certification authority. Such a certificate may only be valid for a tested radio unit which has not been retrospectively changed, supplemented and/or adapted. In this context, according to embodiments of the invention, the radio device provides means which allow a strict separation between the static radio unit and the other radio units of the radio device. Accordingly, by way of example, the static radio unit is a closed radio unit in which no update can take place. For the radio device according to example embodiments of the invention, many different technical standards are provided, which describe technical specifications for the correct operation of the radio device. The correct manner of operation of the radio device according to such embodiments of the invention under one of these standards may be shown by means of the certificate from the certification authority. Examples of such technical standards are, in particular, the standards IEC62304 or DIN EN60601 for medical technology; the standard EN50128 for railway technology; the standard IEC61508 for industry; the standard ISO26262 for the automobile industry; the standards DO-178B/C, ID-12B/C or DO-254 for avionics systems and the standards DO-278A or ID-109A for air traffic control (acronym: ATC).

A certificate according to one of the standards described here means that the static radio unit does not allow an update from the outside and is operated in an unchanged manner. Accordingly, by way of further example, after manufacture, an update can no longer be implemented from the outside without the cooperation of the manufacturer. If the static radio unit is supplied as a closed system, the certification is substantially simplified. In this context, for example, the statically implemented parts are kept minimal and simple in the radio unit. In particular, for example, the static radio unit is independent of the dynamic radio unit or the dynamic radio units with regard to voltage supply, command transmission, setups, antenna and antenna-switching circuit and/or any data interface for the reception of the information to be transmitted.

According to a further embodiment, the at least one dynamic radio unit can be updatable by means of an update information of the radio-device control unit. This has the advantage that additive radio methods can be integrated into such dynamic radio units. By way of example, the dynamic radio unit can be adapted to more recent wave forms, to more complex and more secure transmission methods and to newer encryption algorithms.

In this manner, the radio device advantageously becomes future-proof and is always up-to-date as a result of such dynamic radio units. Errors in a radio method of the dynamic radio unit can easily be corrected. This dynamic radio unit can be updated and varied from the outside after manufacture. Changes to such dynamic radio units have no retroactive influence on the static radio unit with the radio method implemented statically within it, so that the certificate of the static radio unit does not become invalid, even after the update or change to one of the dynamic radio units.

According to a further embodiment, the dynamic radio unit is embodied according to the principle of an open architecture, especially of the Software Communications Architecture, abbreviated as SCA. This open architecture regulates the interplay between hardware and software in radio units capable of dynamic modification through software (software-defined radios, abbreviated as SDR). The principal object of this architecture is to specify the dynamic radio unit for variable transmitters and receivers and to embody the radio units in an inter-operable manner.

By way of example, the update information can be connected to the radio-device control unit by means of an external update signal. Accordingly, the radio device is embodied in such a manner that it can be updated and changed from the outside. As a result of the decoupling from the static radio unit, the certificate of the static radio unit does not become invalid, thereby saving costs for the operation of the radio device and also ensuring that the static radio unit can be operated without influence from the dynamic radio unit and therefore in a disturbance-free manner. The external update signal is generated and connected to the radio-device control unit upon request from a user or with reference to the radio-device configuration on the basis of detected information to be transmitted.

According to a further embodiment, the static radio unit and at least one dynamic radio unit can be operated in parallel, wherein at least one of the parallel-capable radio units is activated for the transmission of information. This means that these parallel-capable radio units are radio ready. This allows a rapid and especially real-time switchover between the individual radio units. Especially in an emergency situation, this is of great importance.

By way of example, the switchover signal is an external control signal. Accordingly, the switchover to a different radio method can be implemented from outside the radio device. A user can explicitly transmit a command to the radio-device control unit. In an alternative embodiment, an adequate radio method is selected by the radio-device control unit on the basis of the information to be transmitted.

By way of further example, the static radio unit and also the radio-device control unit are integrated in the radio device in an invariable manner. Accordingly, these two units perform a function as main control elements which substantially control the radio device. In view of their invariability, no loss of certification is caused as a result of changes in the dynamic radio units. On the one hand, this increases the failsafe security of the radio device and, on the other hand, simplifies the certification of the radio device.

According to a further embodiment, the information is connected to the radio device via a data interface, wherein a switchover between the radio units is implemented dependent upon the type of information. By way of example, analogue and digital information is made available via the data interface. The data interface is a bidirectional data interface. With regard to the type of information, a distinction is made especially between language information and data information. Accordingly, because of the different type of information, the selection of an alternative radio method is occasionally necessary. For example, a high data throughput is desired in the transmission of data, so that the radio method must in general be embodied to be more complex, in order to transmit this information in a lossless manner.

According to a further embodiment, the data interface provides a data-signal switchover unit, wherein the data-signal switchover unit receives the switchover signal of the radio-device control unit. This ensures that a switchover of the data interface is implemented automatically or triggered from the outside dependent upon the type of information.

In an advantageous manner, the radio device provides at least one first dynamic radio unit and one second dynamic radio unit. The dynamic radio units can be updated correspondingly and can be adapted with alternative and/or complex waveforms. Further, more than two dynamic radio units are provided, so that the radio device can be used for a plurality of different radio transmissions.

By way of example, an antenna switchover unit is provided in the radio device in order to connect the respective radio unit to the antenna. In this context, a common antenna-switching circuit is especially provided, thereby substantially simplifying the manufacture of the radio device so that the radio device can be manufactured in a more cost-effective manner. For example, control of the antenna switchover unit is preferably implemented by the radio-device control unit.

Alternatively, it is conceivable to provide several antennas, wherein each antenna is allocated exclusively to one radio unit. Accordingly, a switchover is advantageously possible within an ad hoc method.

In accordance with example embodiments of the invention for the transmission of information, a method comprises: setting up a radio connection by means of a first radio method; setting up at least one radio connection by means of a second radio method; activation of a radio method which has been set up; evaluation of a control signal by means of the radio-device control unit; checking of the switchover to an alternative radio method by means of the radio-device control unit; switchover to an alternative radio method if the checking requires a switchover; and transmission of the information with an alternative radio method.

The transmission of information is made possible through the activation of a set-up radio method. In this context, by way of example, the corresponding radio method which has been set up in a similar manner remains active or respectively is available in a standby mode. Accordingly, it is advantageously possible to switch between the radio methods immediately, and real-time transmission is therefore achieved.

By way of example, a switchover signal is generated by means of the radio-device control unit before the step of the switchover.

By way of further example, an update request of at least one of the set-up radio methods is obtained at any time. Following this, a check regarding the need for a switchover is implemented. After this, a switchover to an alternative radio method is implemented if the checking step requires a switchover. The radio method to be updated is then updated.

The step of checking is necessary in order to identify whether the radio method to be updated has already been set up and activated and is disposed in a communications connection with a communications participant. If this is the case, an update would not be possible without disturbing or preventing the radio traffic with the communications participant. In such a case, the switchover to an alternative radio method is preferred.

By way of further example, a switchover signal is generated by means of the radio-device control unit before the step of the switchover.

BRIEF DESCRIPTION OF THE DRAWINGS

Various example embodiments of the present invention are described in greater detail with reference to the drawings, wherein the Figures describe only example embodiments of the invention. Identical components in the Figures are marked with the same reference numbers. The drawings show.

DETAILED DESCRIPTION OF THE PREFERRED EMBODIMENTS

Different embodiments will now be described more fully hereinafter with reference to the accompanying drawings, whereby a radio device and a method for the transmission of information, with the assistance of which it is possible to switch between different radio methods in real-time and in a disturbance-free manner, are described. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
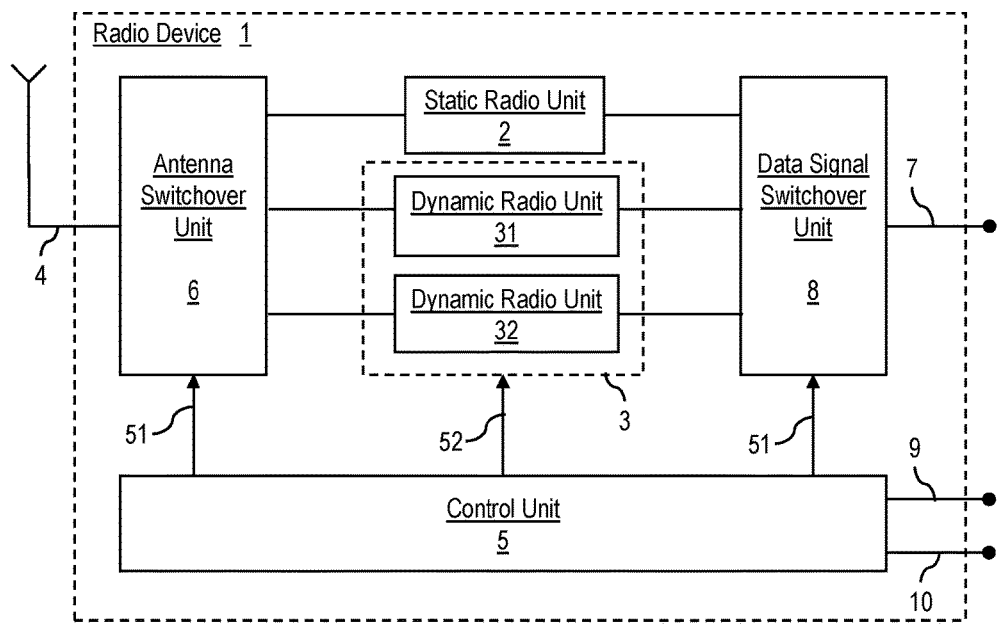
FIG. 1 a block-circuit diagram of a first example of a radio device according to embodiments of the invention.

FIG. 1 shows a radio device 1 according to an example embodiment of the invention. The radio device 1 provides an antenna 4 and a data interface 7 to a user. Furthermore, the radio device 1 provides a radio-device control unit 5. The radio-device control unit 5 provides an update interface 9 for an update signal and a control interface 10 for a control signal. The control signal is provided to allow the user or an automatic unit to implement the switchover between the radio methods. By means of the control interface and the control signal, the radio device 1 is notified that a distinction is to be made between the different radio methods. Via the data interface 7, information, for example, data information and/or language information, can be exchanged in a bidirectional manner between the user and the radio device 1. Via the update interface, an update signal can be connected to the radio-device control unit 5 in order to notify the radio device 1 that an additive radio method has been downloaded or one of the dynamic radio units 3, 31, 32 has been supplemented or updated. The core radio methods, for example, a certified emergency radio method, are retained in this context without change.

According to one embodiment, the radio device 1 provides at least one static radio unit 2. The static radio unit 2 contains the core radio method and, like the radio-device control unit 5, is integrated within the radio device 1 as a non-variable part. The radio-device control unit 5 is integrated in the radio device 1 in conjunction with the static radio unit 2 as a master. The static radio unit 2 and also the radio-device control unit 5 can no longer be updated or varied from the outside after manufacture. In particular, the static radio unit 2 is certified by an authorized certification authority according to one of the standards named above. Accordingly, a failsafe security of the radio device 1 is provided and the certification is simplified because of the invariability of these components within the radio device 1. In particular, the static radio unit 2 is independent of the dynamic radio units 3 which can be updated via the control interface 10 and the update interface 9.

According to one embodiment, the radio device 1 further provides at least one dynamic radio unit 3. According to FIG. 1, two mutually independent dynamic radio units 31 and 32 are provided. By means of the switchover signal 51, the radio-device control unit 5 indicates to the antenna switchover unit 6 and to the data-signal switchover unit 8 that it is necessary to switch between the different radio units 2, 3. In the following, the functioning of a radio device 1 according to FIG. 1 will be explained in greater detail.

By way of example, for switchover according to embodiments of the invention, at least two radio units 2, 3 within the radio device 1 are radio ready, so that these radio units 2, 3 are in a standby mode and/or in an active condition. For example, the radio unit 2 and one of the dynamic radio units 3 is activated, so that a parallel operation is possible. By means of the data interface 7, user information is prepared for transmission, or information is transmitted on the basis of the bidirectional embodiment from the antenna 4 to a user. Dependent upon the type of information, it is meaningful to adapt the radio method accordingly. For example, a distinction should be made between language information and data information which are to be transmitted.

By way of further example, in order to allow a real-time switchover and uninterrupted transmission of the data, provision is made to switch between the individual radio methods. For this purpose, a control signal is provided to the radio-device control unit 5 in the radio device 1. This control signal indicates which radio method is to be used in order to transmit data and information which are connected to the radio device 1 via a data interface 7. If the radio device 1 detects via the radio-device control unit 5 that the radio method must be switched, a switchover signal 51 is connected to the antenna switchover unit 6 and the data-signal switchover unit 8.

The switchover may be implemented in an ad hoc manner from the radio method in use to the alternative radio method. Since both radio methods are at least in a standby mode, it is possible to switch in a real-time manner. An effort-intensive downloading of the radio method and activation or respectively set up of the communications connection with the communications participant is therefore not necessary. This saves valuable time, especially in an emergency situation. By way of further example, the antenna 4 is connected downstream of the antenna switchover unit 6. The control of this antenna switchover unit 6 is implemented via the radio-device control unit 5. This switchover unit 6 is optional.

By way of further example, a parallel operation of the radio methods is implemented to achieve a real-time switchover between the individual radio methods. Accordingly, at least one radio unit 2, 3 is active and at least one further radio unit 2, 3 is in standby mode and can be activated as required in order to receive or to send data immediately.

Since the static radio unit cannot be updated, the certificate is retained even if one of the dynamic radio units 3, 31, 32 is updated. In particular, it is ensured that there is no retroactive influence from the expansion of a dynamic radio unit 3 on the static radio unit 2.

Figure 2:
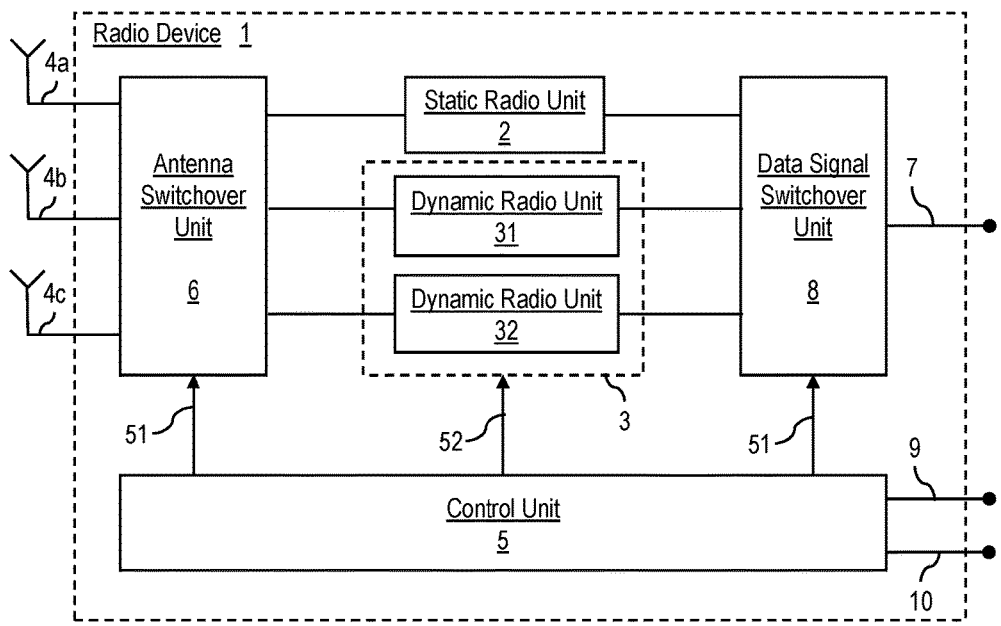
FIG. 2 a block-circuit diagram of a second example of a radio device according to embodiments of the invention.

FIG. 2 shows an example embodiment of a radio device 1 according to the invention as an alternative to FIG. 1. In the following, reference will be made only to the differences between FIG. 1 and FIG. 2.

With reference to the example of FIG. 2, By way of difference from FIG. 1, the radio device 1 according to FIG. 2 provides a first antenna 4a, which is provided exclusively for the transmission of information by means of a radio method of the static radio unit 2. Furthermore, a second antenna 4b is provided which serves exclusively for the transmission of information by means of a radio method of the first dynamic radio unit 31. Furthermore, a third antenna 4c is provided which serves exclusively for the transmission of information by means of a radio method of the second dynamic radio unit 32.

The use of a plurality of antennas means that the radio methods can also be operated in parallel, so that several radio methods are active at the same time. This facilitates a real-time switchover and, in particular, achieves a saving of time especially in emergency situations.

As an alternative example, which is not illustrated in FIG. 2, provision is made to arrange only two antennas in the radio device 1, wherein a first antenna is provided exclusively for the static radio unit 2, and a second antenna is provided exclusively for all of the dynamic radio units 3, 31, 32. Accordingly, on the one hand, a strict physical separation is achieved in the transmission of information by means of the static radio unit 2 and in the transmission of information by means of the dynamic radio units 3, 31, 32. On the other hand, the costs for the manufacture of the radio device 1 are reduced, because the dynamic radio units 3, 31, 32 share an antenna circuit, thereby reducing the hardware effort.

Figure 3:
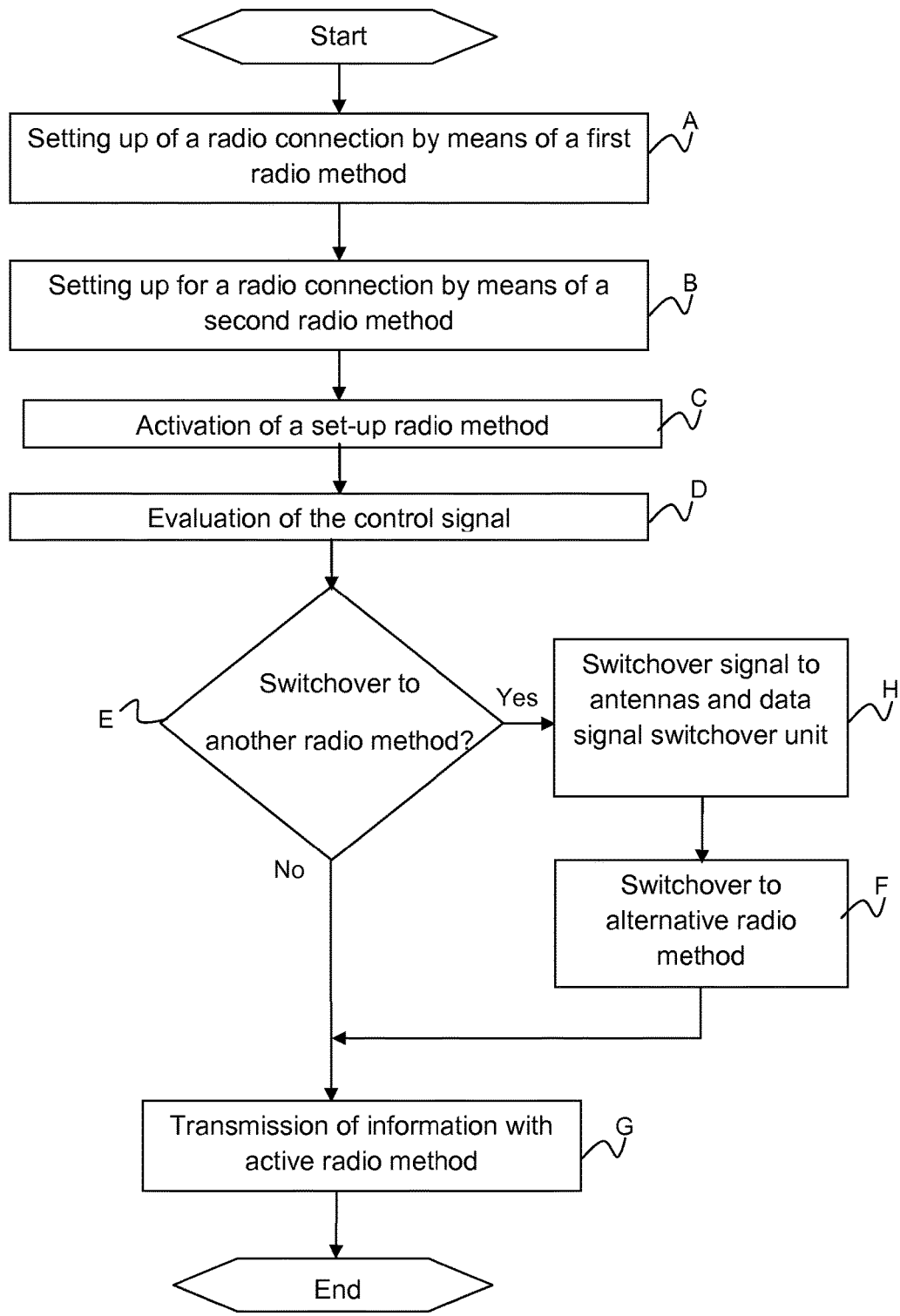
FIG. 3 a flow diagram of a method according to example embodiments of the invention.

FIG. 3 shows a flow diagram of a method according to example embodiments of the invention. In this context, in a step A, the setup of a radio connection is achieved by means of a first radio method. In step B, the setting up of a radio connection by means of a second radio method is implemented. The first radio method is different from the second radio method. In particular, the first radio method is set up by means of the static radio unit 2. In particular, the second radio method of step B is set up with a dynamic radio unit 3. In step C, at least one of the set-up radio methods is activated. From this time, the transmission of information by means of the radio device 1 is possible via one of the radio units 2, 3, 31, 32. In particular, provision is made for several radio methods to be activated at the same time, or at least to be capable of being activated in standby mode.

In step D, the evaluation of the control signal is implemented. The control signal is connected to the radio-device control unit 5 via the control interface 10 as an external control signal to indicate whether the type of information has changed. In step E, a check is carried out to determine the extent to which the evaluation result from step D determines a switchover to another radio method. If the result of step E is that a switchover to an alternative radio method is not necessary, the transmission of the information is implemented according to step G with the radio method activated so far. If the result of the checking step E is that a switchover to a different radio method is necessary, in the following step H, a switchover signal 51 is connected to the antenna-signal and data-signal switchover unit 6, 8. By way of example, the switchover signal 51 is generated by means of the radio-device control unit 5. In the following step F, the switchover to an alternative radio method is implemented, brought about by means of an alternative radio unit. When the switchover according to step F has taken place, the information is transmitted, according to step G, with the now active radio unit.

Figure 4:
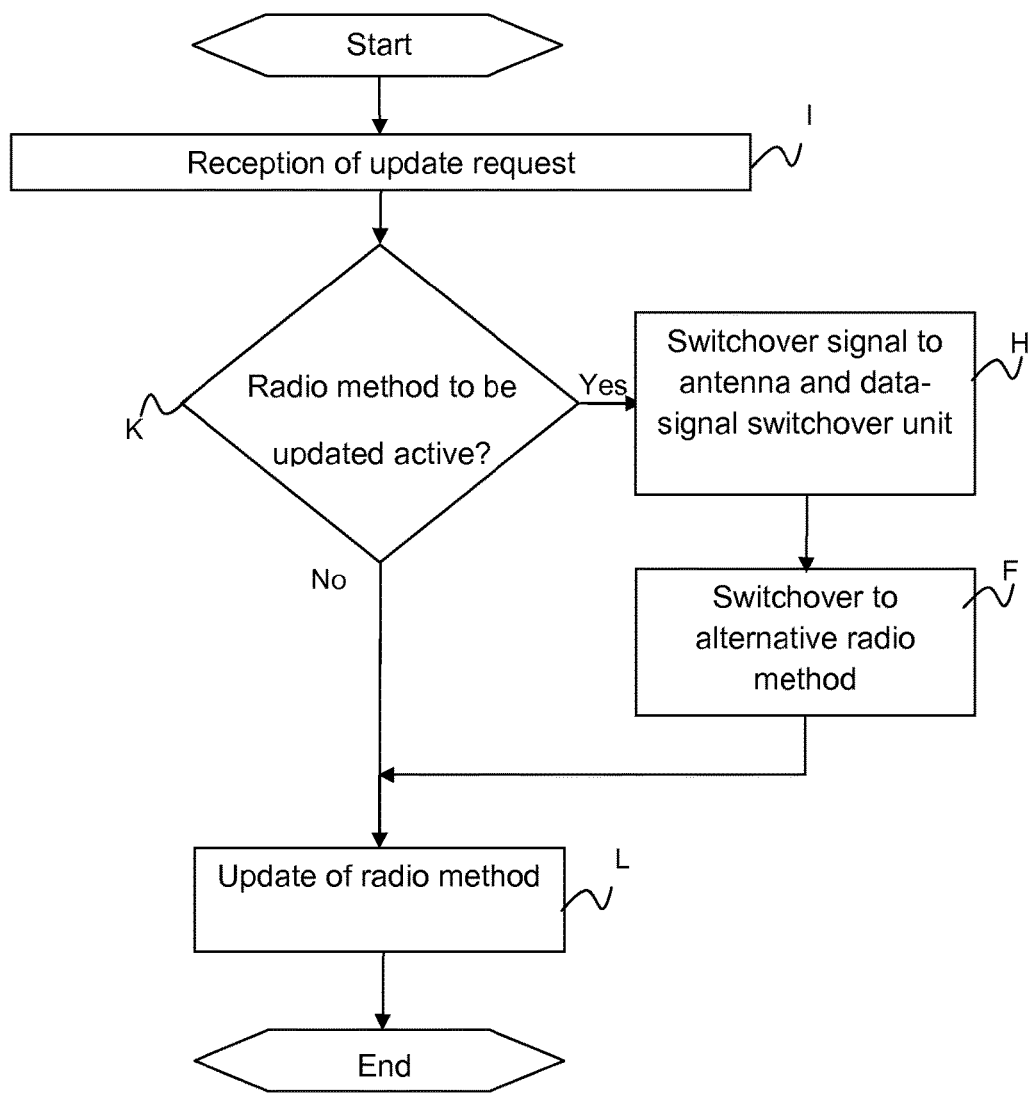
FIG. 4 a further flow diagram with regard to the method shown in FIG. 3 according to example embodiments of the invention.

FIG. 4 shows a further flow diagram with regard to the method shown in FIG. 3 according to example embodiments of the invention. Initially, in step I, an update request is received. By way of example, this request is connected externally to the radio device 1 via an update interface 9. In the following step K, a check is implemented to determine whether the radio method to be updated is in an active radio-connection mode. If this is not the case, in the following step L, the update of the radio method is implemented with the effect that the update signal is connected to the radio-device control unit 5, whereupon an update-information signal 52 is rerouted to the dynamic radio unit 3. On the one hand, the update-information 52 can be an improvement of an already integrated dynamic radio method. As an alternative, provision is made for the update information 52 to integrate a completely new radio method, which has not so far been disposed within the radio device 1, into the dynamic radio unit.

If the result of step K is that the radio method to be updated is already active, a switchover signal 51 is transmitted to the antenna-signal and data-signal switchover unit in the following step H. In the following step F, the switchover to an alternative radio method is initialized, so that the update of the radio method can be implemented according to step L.

By way of further example, the control signal can be introduced via the control interface 10. In this context, the user implements the switchover him/herself between the radio units 2, 3, 31, 32 according to step F. The user can implement the switchover via an explicit command. Alternatively, a device configuration of the radio device 1 detects automatically, on the basis of an evaluation of the information to be transmitted, which radio unit 2, 3, 31, 32 is most suitable for the transmission and generates the corresponding switchover signal 51.

In particular, the update signal may contain information indicating that an additive radio method can be downloaded. The core radio method in the static radio unit 2 remains unchanged.

By way of further example, the data-signal switchover unit 8 is provided in order to supply data information and/or language information to be transmitted to one of the radio units 2, 3, 31, 32 or respectively to present to a user via the data-signal interface data information and/or language information received by means of the antenna 4 from one of the radio units 2, 3, 31, 32. The data-signal interface is accordingly embodied in a bidirectional manner. A control of this data-signal switchover unit 8 is implemented via the radio-device control unit 5.

According to one embodiment, the dynamic radio unit 3 comprises a plurality of dynamic radio units. Accordingly, a first dynamic radio unit 31 and a second dynamic radio unit 32 can be provided. The dynamic radio units 31, 32 are independent radio units between which it is possible to switch. In particular, the dynamic radio units 31, 32 can be expanded, so that additive radio methods can be integrated into the radio device 1. Furthermore, provision is made for further dynamic radio methods to be transmitted via the update interface 9 to the radio device 1 and integrated into the radio device 1. As a result, the radio device 1 can always be kept at the latest state of development for new wave forms, improved encryption algorithms and/or error removal methods.

By way of example, all radio units 2, 3, 31, 32 are always active, wherein only one is connected to the user via the data-signal switchover unit 8. If sufficient hardware resources are not available in the radio device 1 to keep all radio units 2, 3, 31, 32 activated, the static radio unit 2, in particular, and at least one of the dynamic radio units 3 is activated, so that it is possible to operate in a real-time manner during a change of the radio method.

By way of further example, the dynamic radio unit 3 can be updated by means of an external update signal. Particularly complex radio methods which contain effort-intensive encryptions and/or characteristic waveforms can be integrated in this context. Accordingly, the static radio unit 2 is constructed in a very simple manner, whereas the dynamic radio units 3, 31, 32 can be constructed in a complex manner.

All of the elements described and/or illustrated and/or claimed can be combined with one another arbitrarily within the scope of the invention. In particular, the device features and method features can be combined with one another arbitrarily.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio device for the transmission of information comprising:
   a controller;
   at least one antenna;
   an antenna switch; and
   at least two radios;
   wherein two or more of the at least two radios are configured to simultaneously be set in a radio-ready mode whereby a radio communications connection with a communications participant is set up in each of the radio-ready radios prior to a switchover between radio-ready radios,
   wherein the controller is configured to switch operation of the radio device from one of the radio-ready radios to another of the radio-ready radios in a real-time manner without interruption of the operation, and
   wherein one or more of the at least two radios is/are configured as static radio(s) and one or more of the at least two radios is/are configured as dynamic radio(s), and wherein at least one of the one or more static radios and at least one of the one or more dynamic radios are configured for parallel operation, wherein, at a given time, at least one of the parallel-capable radios is activated for the transmission of the information, and wherein a radio function is implemented statically in each of the one or more static radios whereby the radio function of each of the one or more static radios is configured to be invariable and thereby operate with a functionality as implemented during manufacture.

2. The radio device according to claim 1, wherein at least one of the one or more static radios is configured to be certifiable by an authorized certification authority.

3. The radio device according to claim 1, wherein the controller is further configured to dynamically update the one or more dynamic radios.

4. The radio device according to claim 3, wherein the controller is configured to dynamically update the one or more dynamic radios based on configuration information provided to the controller by means of an external update signal.

5. The radio device according to claim 1, wherein the controller is configured to execute the switchover in response to an external control signal.

6. The radio device according to claim 1, wherein the one or more static radios and the controller are integrated within the radio device in an unmodifiable manner.

7. The radio device according to claim 1, wherein the radio device is configured to receive the information via a data interface, and wherein the controller is configured to execute the switchover based upon a type of the information.

8. The radio device according to claim 7, wherein the data interface includes a data-signal switch, and wherein the data-signal switch is configured to receive a switchover signal from the controller.

9. The radio device according to claim 1, wherein the radios include at least one first dynamic radio and a second dynamic radio.

10. The radio device according to claim 1, wherein the antenna switch is configured to connect the respective operational radio to the antenna.

11. A method for radio transmission of information comprising:
    configuring two or more simultaneous radio connections, each by means of a respective radio function, wherein each radio connection comprises a radio communications connection with a communications participant that is configured prior to a switchover between radio devices;
    activating a one of the radio connections and transmitting the information based on the respective radio function;
    determining a signaling for a switchover to an alternate one of the radio connections; and
    executing a switchover from the activated radio connection to the alternate radio connection in a real-time manner without interruption of operation of the information transmission, and transmitting the information based on the respective radio function of the alternate radio connection;
    wherein the respective radio function of at least one of the radio connections is configured as a static radio function and the respective radio function of at least one further of the radio connections is configured as a dynamic radio function, and wherein each static radio function is implemented statically whereby the radio function of the static radio connection is invariable and thereby operates with a functionality as implemented during manufacture.

12. The method according to claim 11, wherein, before the execution of the switchover, a switchover signal is generated by means of a controller.

13. The method according to claim 11, further comprising:
 receiving an update request for reconfiguration of at least one of the configured radio connections; and
 reconfiguring the at least one configured radio connection in accordance with the update request.

14. The method according to claim 13, wherein the at least one configured radio connection that is/are reconfigured comprise the radio connections with respective radio functions configured as the dynamic radio functions.

* * * * *